July 15, 1969

C. GUNN-RUSSELL 3,456,116

APPARATUS FOR DETECTING SLOWLY CHANGING
CHARACTERISTICS OF MOVING YARN

Filed June 15, 1965

United States Patent Office

3,456,116
Patented July 15, 1969

3,456,116
APPARATUS FOR DETECTING SLOWLY CHANGING CHARACTERISTICS OF MOVING YARN
Charles Gunn-Russell, London, England, assignor to Leesona Corporation, Warwick, R.I., a corporation of Massachusetts
Filed June 15, 1965, Ser. No. 464,246
Claims priority, application Great Britain, June 16, 1964, 24,992/64
Int. Cl. G01n 21/30
U.S. Cl. 250—219    7 Claims

ABSTRACT OF THE DISCLOSURE

An optical sensing system provides pulsating signals changing with characteristics of moving yarn. An R-C comparison circuit is fashioned for response between lower $f$ and and higher $F$ frequency limits to eliminate signals from changing temperature or dust in the optical system on the one hand and extending signal threads on the other hand. Two capacitors of different sizes are charged to substantially equal steady state voltages and a detector responds to an unbalance of voltages caused by signal fluctuations within the two frequencies.

---

The present invention relates to apparatus for detecting changes of quality by optical scanning.

An especially important application of such apparatus is to the scanning of filamentary material. For example, in the textile industry means must be provided for eliminating slubs from spun yarn and for this purpose slub catchers have long been employed. The traditional slub catcher with its mechanical sensing and cutting device tends to be unsatisfactory in many circumstances, especially with thin yarns. Various attempts have been made to relieve the cutting device of its sensing function. Of the non-mechanical sensing devices applicable for actuating the cutting device, optical scanning devices are potentially the most attractive, but difficulties have been encountered in their application on account of the dust to which they are exposed in practice. The dust accumulates to interfere with the passage of light from the light source to the photo-electric cell or other optical-electric transducer and so reduces the sensitivity of the system progressively.

Because of this effect the obvious simple system of a transducer followed by a cutting device cannot, in practice, be made to respond reliably to faults which do not involve a sudden change in the diameter of the yarn. Such faults can seriously affect the quality of the yarn and it is accordingly desirable that they should be detected. For this purpose a more complex system is required, for example, a system in which a second transducer exposed to the same conditions as the actual scanning transducer provides a reference signal.

In accordance with the present invention there is provided an apparatus for detecting by optical scanning changes of quality determinable by a signal waveform of which the frequency components lie between a lower frequency $F$ and a higher frequency $F$. Typical apparatus comprises an optical-electric device operable to generate an output signal in which a carrier frequency above the frequency $F$ is modulated by said signal waveform, an amplifying device for the carrier frequency signal from the transducer, a demodulator for the amplified signal, a detector responsive to the demodulated signal and a filter or inertia circuit having a capacitor chargeable after sufficient delay (e.g. on account of a long time constant or the inclusion of a thermistor) to be substantially non-responsive to frequency components greater than $f$. A further capacitor circuit with a shorter time constant and substantially equal voltage serves as a reference output circuit for producing a reference signal attenuated at frequencies above $F$ for the detector. By making the detector respond to unbalanced capacitor voltages, long term changes at the output of the transducer are served while maintaining the detector responsive to frequencies of from $f$ to $F$.

In a typical application the optical-electric device contains an optical-electric transducer incorporated in a yarn scanning head having a light source, preferably of the semi-conductor type, driven to provide an output of visible or invisible illumination such as infra-red, fluctuating at the carrier frequency by an oscillator. The output of the demodulator is connected with a relay, gating circuit, or other detector controlling a cutting knife. For the detector to respond to slubs at the usual yarn speeds the apparatus should be capable of handling modulation signals up to the order of kilocycles. At yarn speeds of from 300 to 1200 yards per minute the ability to handle modulating signals of from 10 c.p.s. to 12 kc.p.s. is desirable. The carrier frequency must, of course, be substantially greater than the maximum signal frequency $F$.

Advantageously the waveform of the illumination is pulsed, and the pulse width and frequency are made variable to compensate for different ranges of yarn speed so enabling identical scanning heads to be used on a wide variety of textile machines. A pulsed waveform is largely unavoidable with most convenient types of light source even when driven by a sinusoidal oscillator. Where desired an oscillator giving a pulsed output of variable pulse frequency and pulse width may be provided. A carrier frequency amplifying device capable of reasonable preservation of the pulse waveform and of giving a suitably uniform response over the carried signal bandwidth tends to be more economically provided than is a wide range amplifier of the ordinary non-carrier type.

The oscillator for driving the light source is obviously an expensive item of equipment, but yarn scanning heads must normally be provided in such numbers that when a single oscillator is shared between them as preferred, the cost of the oscillator per head is acceptably small.

Slow changes in the output from the transducer, may be produced, for example, by the accumulation of dust or variations of temperature. These changes not representative of faults in the yarn correspond to frequencies less than $f$. An inertia or filter circuit prevents such slow changes from operating an alarm.

Gradual changes of diameter of the yarn corresponding with signal frequencies greater than $f$ produced for example by spinners doubles or drafting faults, yield an output from the detector and, like the changes produced by slubs, may be applied to actuate a fault alarm device or cutter.

The effect of the inertia circuit is to produce a reference output to compensate for such long term changes as arise from circuit drift or deterioration as well as slow changes referred to hereinbefore. An additional inertia circuit, connected as an automatic gain control loop for the amplifier, may be provided if desired.

Advantageously, the path of the signal for comparison with the reference output is provided with a circuit having a definite attenuation at frequencies substantially exceeding $F$. By this arrangement the apparatus is rendered non-responsive to frequencies substantially above $F$ so that the detector does not respond to very short term signals. With some forms of apparatus proposed heretofore, slubs of objectionable dimensions could not be distinguished from minor slubs or even from such normal features as fibres projecting from spun yarn and giving it required characteristics.

To illustrate the effect of connecting the inertia circuit to provide a reference output, there may be considered an apparatus having a carrier frequency amplifier giving a nominal rectified output of 10 volts, and a detector which operates a cutting knife in response to changes of ±1 volt in the output of the demodulator. If a reference level for the detector is provided by connection to a steady source of 10 volts, a drift of more than one decibel (10%) produces a departure of more than 1 volt from the nominal output and causes a false operation of the detector.

In contrast, with the reference output circuit, the apparatus now provided can tolerate a cheap and simple amplifier having a drift of, for example, ±15%. If a rise of 1.5 volts occurs in the output as a result of drift, the reference signal rises sympathetically and, even though it probably does not rise by 1.5 volts exactly, a substantial improvement is obtained.

In a preferred construction the reference output circuit comprises a reservoir capacitor fed with the demodulated signal including its D.C. component via a resistor, the time constant of the combination being sufficient to prevent substantial change in the reference output in response to frequencies as high as $f$. Drift in the amplifier, or slow contamination of the optical system, being comparatively slow, tend to produce in the reference output a compensating change which prevents spurious operation of the detector. Events producing wanted signals represented by frequencies of from $f$ to $F$ are too rapid to produce a significant response in the reference output. Similarly, the signal path may be provided with a capacitor and resistor providing a time constant appropriate for preventing response to frequencies substantially exceeding $F$.

For the detection of slow changes in the yarn diameter the inertia may be provided by, or correspond with, a time constant of several seconds and in order that the apparatus can be brought rapidly into operation the inertia circuit is preferably provided with a short-circuiting push button or other device by which it may be rendered inactive, thus giving virtually instantaneous setting.

The detector is preferably made adjustable to suit particular requirements.

Obviously the apparatus provided by the invention may be employed for purposes other than the scanning of yarn. It may, for example, be employed for monitoring the thickness of light transmitting plastic films.

The following description of preferred embodiments of the present invention, in which description reference is made to the accompanying drawings is given by way of illustration.

Figure 1:
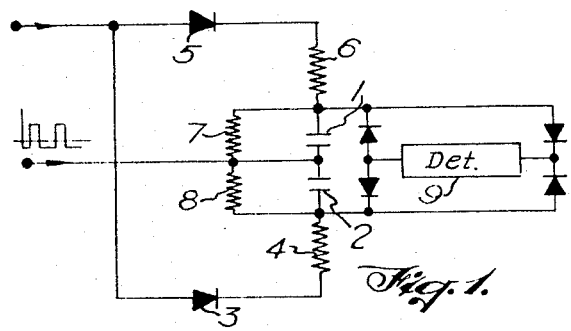
FIGURE 1 shows a first arrangement of the detector and reference circuit.
Figure 4:
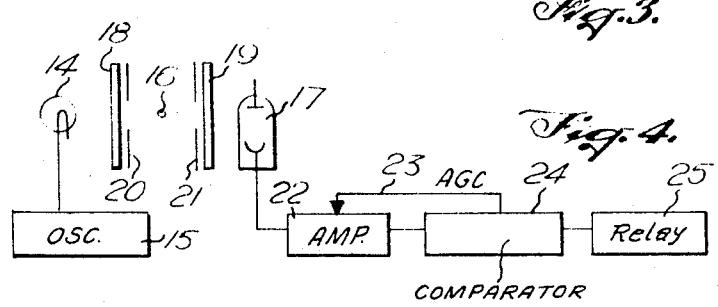
FIGURE 4 is a block diagram showing how the signal for the arrangement of FIGURE 1 or FIGURE 3 may be derived from a yarn.

With the circuit of FIGURE 1 the reservoir capacitor 2 is charged via rectifier 3 and resistor 4 by the positive-going part of the signal waveform from an automatic gain controlled carrier frequency amplifier arranged as shown in FIGURE 4. Similarly a capacitor 1, small in comparison with reservoir capacitor 2, is charged via rectifier 5 and resistor 6. As long as the output of the amplifier remains constant the voltages across capacitors 2 and 1 also remain steady. Resistors 7 and 8 connected as shown and so related that (resistance of resistor 6×resistance of resistor 8)=(resistance of resistor 7×resistance of resistor 4) and the resistances of resistors 6 and 7 are small in comparison with the resistance of resistors 4 and 8, ensure that the voltages are equal under steady state conditions and that, accordingly, no signal reaches the detector 9 which in the case shown is connected with capacitors 1 and 2 via a bridge rectifier network.

The values of capacitors 1 and 2 are chosen so that a change in the positive-going part of the rectified signal having frequency components of $f$ to $F$ does not significantly affect the voltage across capacitor 2 but it does produce a change in the voltage across capacitor 1. If there is an unbalance larger than a predetermined amount, detector 9 operates an alarm. The time constant of resistor 6 and capacitor 1 with resistor 7 in parallel is such that the detector does not respond to signals of frequency substantially greater than $F$.

On the other hand, changes in the positive-going signal level produced by amplifier drifts are slow enough to allow the voltage across capacitor 2 to follow the voltage change across capacitor 1 and remain substantially equal thereto so that substantially no signal is detected through the rectifier bridge network.

Figure 2:
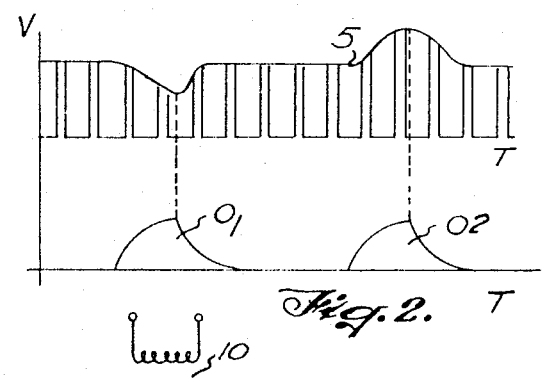
FIGURE 2 shows the input and output waveforms of the arrangement of FIGURE 1.

As the capacitors 1 and 2 respond only to the positive-going parts of the signal waveform the operation of the circuit is independent of the symmetry of the signal. A typical waveform consisting of positive-going pulses modulated to the signal envelope S is shown in the upper part of FIGURE 2. The output signals O1 and O2 to the detector produced respectively by decreases and increases in the modulation level are both positive-going.

Figure 3:
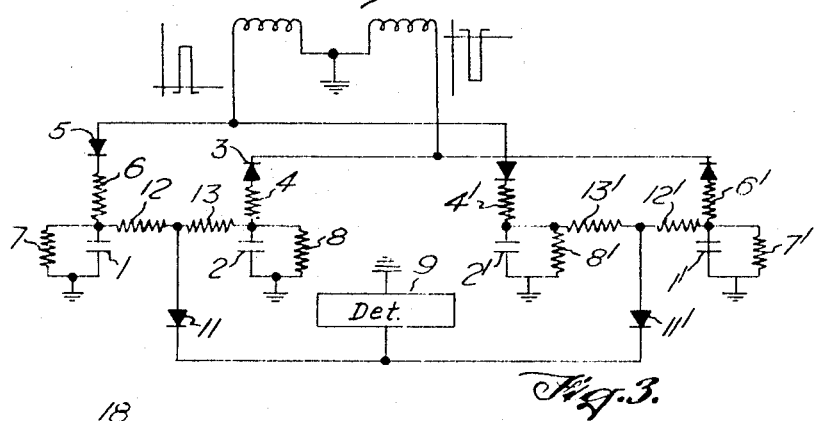
FIGURE 3 shows a second arrangement of the detector and reference circuit.

The circuit shown in FIGURE 3 is generally similar in its operation to the circuit shown in FIGURE 1 but is a current-operated rather than a voltage-operated device with a push-pull input derived from transformer 10. It has two reservoir capacitors 2 and 2′ which provide negative and positive reference signals respectively. An increase of the signal level actuates the detector 9 via rectifier 11 and a decrease actuates it via rectifier 11′. Resistors 12 and 13 are equal and comparable with resistor 8. Corresponding components in the two halves of the circuit have substantially the same values. This circuit, being symmetrical to earth, is preferred to that of FIGURE 1 under conditions when stray capacities become significant.

This circuit operates generally in the same manner as described above, with small capacitor 1 and large capacitor 2 determining the frequency components that are passed to detector 9 when the voltages across the two capacitors become unequal. Half wave rectifier 11 replaces the bridge circuit formerly described.

The detailed design and construction of the apparatus of the invention, conveniently using simple transistorized circuits on a printed circuit board, is well within the skill of the art once the principles of the invention have been understood.

FIGURE 4 shows an arrangement for supplying the requisite signal to the circuit of FIGURE 1 or FIGURE 3. Yarn 16 to be scanned runs through a scanning head illuminated by a light source, e.g. a gallium arsenide emitter 14, driven by an oscillator 15. In the head are diffusers 18 and 19 and apertures 20 and 21. The modulated light signal is converted to a corresponding electrical signal by a photo-diode 17 which is amplified by A.C. amplifier 22 having an internal A.G.C. line 23.

The comparator circuit of FIGURE 1 or FIGURE 3 is shown at 24 and the relay or yarn cutter at 25.

The modulated carrier may be derived from the yarn by arrangements other than those hereinbefore described. For example, the light source may be a non-pulsed light source, such as a lamp energized by D.C. and the photocell either replaced by a photo-diode pulse-biased at the carrier frequency or applied to modulate a carrier by means of a conventional modulation circuit.

I claim:

1. Apparatus for detecting changes in dimensions of a traveling yarn, or the like for sensitivity to slowly changing faults such as spinners doubles represented by a frequency not lower than $f$ and to suddenly changing faults such as slubs represented by a frequency no higher than $F$ comprising in combination, an optical system including a photocell producing a signal responsive to changing characteristics in said yarn, oscillator means producing a carrier frequency higher than $F$, means in the optical system modulating said carrier frequency with said signal to produce a modulated signal, means demodulating said signal, a reservoir circuit of sufficient inertia connected to develop from the demodulated signal a first voltage of a predetermined steady state value without substantial change in response to signals of frequencies within the range $f$ to F, a further circuit connected to develop from the demodulated signal a second voltage of a predetermined steady state value without substantial change in response to signals of frequency substantially greater than F and developing signal variations with signals within the range $f$ to F, and comparator means coupled to receive said first and second voltages for developing an alarm signal when the voltages developed by said reservoir and further circuits are significantly unbalanced from their respective said predetermined steady state values.

2. Apparatus as defined in claim 1, including a light source in said optical system driven by said oscillator means to provide illumination fluctuating at the carrier frequency.

3. Apparatus as defined in claim 1, wherein the oscillator produces signals greater than twelve kilocycles per second, the reservoir circuit frequency ranges from $f$ at ten cycles per second to F at twelve kilocycles per second and the further circuit responds to frequencies below twelve kilocycles per second to develop said signal variations.

4. Apparatus as defined in claim 1, wherein the reservoir circuit comprises a first capacitor of large capacitance and a resistive circuit providing a long time constant compared with that of the further circuit, which further circuit comprises a second capacitor of small capacitance and a resistive circuit.

5. Apparatus as defined in claim 4, wherein the reservoir and further circuits each comprise a resistor connected in series with a capacitor-resistor parallel combination.

6. Apparatus as defined in claim 5, wherein the resistance product of the series resistor of the reservoir circuit and the parallel resistor of the further circuit is equal to the resistance product of the series resistor of the further circuit and the parallel resistor of the reservoir circuit to thereby provide equal voltages across the two capacitors under steady state conditions.

7. Apparatus as defined in claim 6, wherein the comparator means is connected for response when the voltages of the two capacitors differ more than a predetermined threshold value.

References Cited

UNITED STATES PATENTS

| | | |
|---|---|---|
| 2,548,755 | 4/1951 | Vossberg et al. |
| 2,843,757 | 7/1958 | St. John _____ 250—214 |
| 3,293,513 | 12/1966 | Biard et al. |
| 3,303,698 | 2/1967 | Loepfe. |

FOREIGN PATENTS

| | | |
|---|---|---|
| 899,827 | 6/1962 | Great Britain. |

RALPH G. NILSON, Primary Examiner

T. N. GRIGSBY, Assistant Examiner

U.S. Cl. X.R.

73—160; 250—214, 217